(12) United States Patent
Wang et al.

(10) Patent No.: US 7,969,414 B2
(45) Date of Patent: Jun. 28, 2011

(54) MOBILE COMMUNICATION APPARATUS

(75) Inventors: Jhao-Ming Wang, Taipei (TW); Su-Yi Chang, Taipei (TW)

(73) Assignee: Inventec Corporation, Taipei (TW)

( * ) Notice: Subject to any disclaimer, the term of this patent is extended or adjusted under 35 U.S.C. 154(b) by 1054 days.

(21) Appl. No.: 11/808,292

(22) Filed: Jun. 8, 2007

(65) Prior Publication Data

US 2008/0305837 A1 Dec. 11, 2008

(51) Int. Cl.
*G09G 5/00* (2006.01)
(52) U.S. Cl. .......................... 345/156; 345/169; 708/109
(58) Field of Classification Search .......... 345/156–163, 345/168–172, 1.1; 708/100, 109; 455/566
See application file for complete search history.

(56) References Cited

U.S. PATENT DOCUMENTS

| | | | | |
|---|---|---|---|---|
| 4,237,540 A * | 12/1980 | Sato | ............................... | 708/108 |
| 5,661,632 A * | 8/1997 | Register | ...................... | 361/679.3 |
| 6,556,185 B2 * | 4/2003 | Rekimoto | ...................... | 345/157 |
| 6,593,914 B1 * | 7/2003 | Nuovo et al. | ................. | 345/169 |
| 6,904,001 B1 * | 6/2005 | Rast | ................................ | 368/71 |
| 7,311,411 B2 * | 12/2007 | VanderSchuit | ................. | 362/84 |
| 7,355,338 B2 * | 4/2008 | Osame et al. | ................. | 313/503 |
| 7,492,354 B2 * | 2/2009 | Bartholomew et al. | ........ | 345/169 |
| 7,656,393 B2 * | 2/2010 | King et al. | ...................... | 345/173 |
| 2002/0180767 A1 * | 12/2002 | Northway et al. | ............. | 345/698 |
| 2004/0036680 A1 * | 2/2004 | Davis et al. | ..................... | 345/169 |
| 2005/0024339 A1 * | 2/2005 | Yamazaki et al. | ............. | 345/169 |
| 2005/0044510 A1 * | 2/2005 | Yi | .................................. | 715/864 |
| 2007/0171240 A1 * | 7/2007 | Koh | ............................... | 345/649 |

* cited by examiner

*Primary Examiner* — Jason M Mandeville
(74) *Attorney, Agent, or Firm* — Bacon & Thomas, PLLC

(57) ABSTRACT

The present invention discloses a mobile communication apparatus that includes a first casing and a second casing. The first casing has an opening and an operating interface disposed around the opening of a side of the first casing. The second casing has two display screens disposed separately on two corresponding surfaces thereof, and each display screen separately corresponds to a different program module of the mobile communication apparatus. The second casing is pivotally disposed in the opening, such that the second casing can be spun in the opening. If the second casing is turned over to expose a display screen with the operating interface, the mobile communication apparatus then initiates the program module corresponding to the screen display, and the screen display shows messages outputted by the program module.

8 Claims, 4 Drawing Sheets

MOBILE COMMUNICATION APPARATUS

FIELD OF THE INVENTION

The present invention relates to a mobile communication apparatus, and more particularly to a mobile communication apparatus comprising a first casing and a second casing disposed within an opening of the first casing and having a first display screen and a second display screen disposed on two corresponding sides of the second casing respectively, such that a functional module in the mobile communication apparatus will be started according to the position of the second display screen while the second casing being turned.

BACKGROUND OF THE INVENTION

As the electronic industry is blooming, high-tech mobile communication products are developed rapidly, and these high-tech mobile communication products not only save our time, but also satisfy our desire of talking with others and reduce the distance between people. As electronic communication products such as mobile phones and personal digital assistants (PDA) are introduced to the market, major manufacturers keep providing innovative operating interfaces to attract consumers and lead other manufacturers in a severe competition of the market.

Electronic communication products generally provide frequently used applications and functions such as capturing a photo, editing a document, playing a game, conducting a videoconference or performing a network query, and it is common for present electronic communication products to provide multimedia functions (such as the functions of a MP3 player), and thus it becomes one of the necessary specifications to integrate the functions of a MP3 player into an electronic communication product, so that a MP3 device can be integrated into an electronic communication product, and consumers no longer need to buy a MP3 player and an electronic communication product anymore to use the functions of both MP3 player and electronic communication product. Users have high demands on innovative changes of electronic communication products, and thus a convenient and effective structure of the electronic communication products becomes an important index to evaluate whether or not the innovative technology for high-tech products produced by a country leads other countries.

At present, major electronic manufactures aggressively develop their electronic communication products with a short, small, light and thin design to meet the development trend of reducing area and weight of electronic communication products and satisfy consumer requirements. In general, an operating interface provided for using applications and functions of an electronic communication product is a press key (such as a numeric key or a direction key) installed on the electronic communication product for selecting and executing the functions and applications, or a display screen installed on the electronic communication product for displaying an electronic menu for the operations. However, if a user wants to use the applications and functions of the electronic communication product through an operating interface, the user must find a hot key or enter data into an electronic menu to search the desired option of the application or function by their types. Such arrangement causes tremendous inconvenience to the user, and leaves no other alternative for users. Therefore, it is an important subject for related manufacturers and designers to modify the operating interface, and develop an electronic communication product that comes with a user-friendly operating interface for the applications and functions of the electronic communication product.

SUMMARY OF THE INVENTION

In view of the shortcomings of the prior art, the inventor of the present invention based on years of experience in the related industry to conduct extensive researches and experiments, and finally developed a mobile communication apparatus in accordance with the present invention to overcome the shortcoming or inconvenience that requires users to find a hot key or an electronic menu to select their desired applications or functions for executing an applications or a function of the electronic communication product through an operating interface.

It is a primary objective of the present invention to provide a mobile communication apparatus comprising a first casing and a second casing, wherein the first casing includes an opening and an operating interface installed around the periphery of the opening, and the second casing includes a first display screen and a second display screen disposed on two corresponding sides of the second casing respectively, and two corresponding ends are movably and pivotally coupled into the opening, such that the second casing can be movably turned over in the opening. If the second casing is turned to a position such that the first display screen is on the same side with the operating interface, then a first functional module in the mobile communication apparatus will be started, and the first display screen will display a display message outputted by the first functional module. If the second casing is turned to a position such that the second display screen is on the same side with the operating interface, a second functional module in the mobile communication apparatus will be started, and the second display screen will display a display message outputted by the second functional module.

Another objective of the present invention is to provide a mobile communication apparatus, wherein a weight portion is disposed on the second casing at a position apart from an end of the second casing pivotally coupled to the first casing, and the weight portion drives the second casing to turn towards the direction of an end of the first casing to start the first functional module or turn over the first casing, and the weight portion drives the second casing to turn towards another end of the first casing to turn off the first functional module, and start the second functional module due to the gravitational force. Therefore, users simply need to turn over the first casing to switch between the first functional module and the second functional module without the need of clicking or selecting corresponding paths one by one of the mobile communication apparatus, and the invention provides tremendous convenience to users and saves lots of time.

To make it easier for our examiner to understand the objective, technical characteristics and effects of the present invention, preferred embodiments will be described with accompanying drawings as follows:

DETAILED DESCRIPTION OF THE PREFERRED EMBODIMENTS

Figure 1:
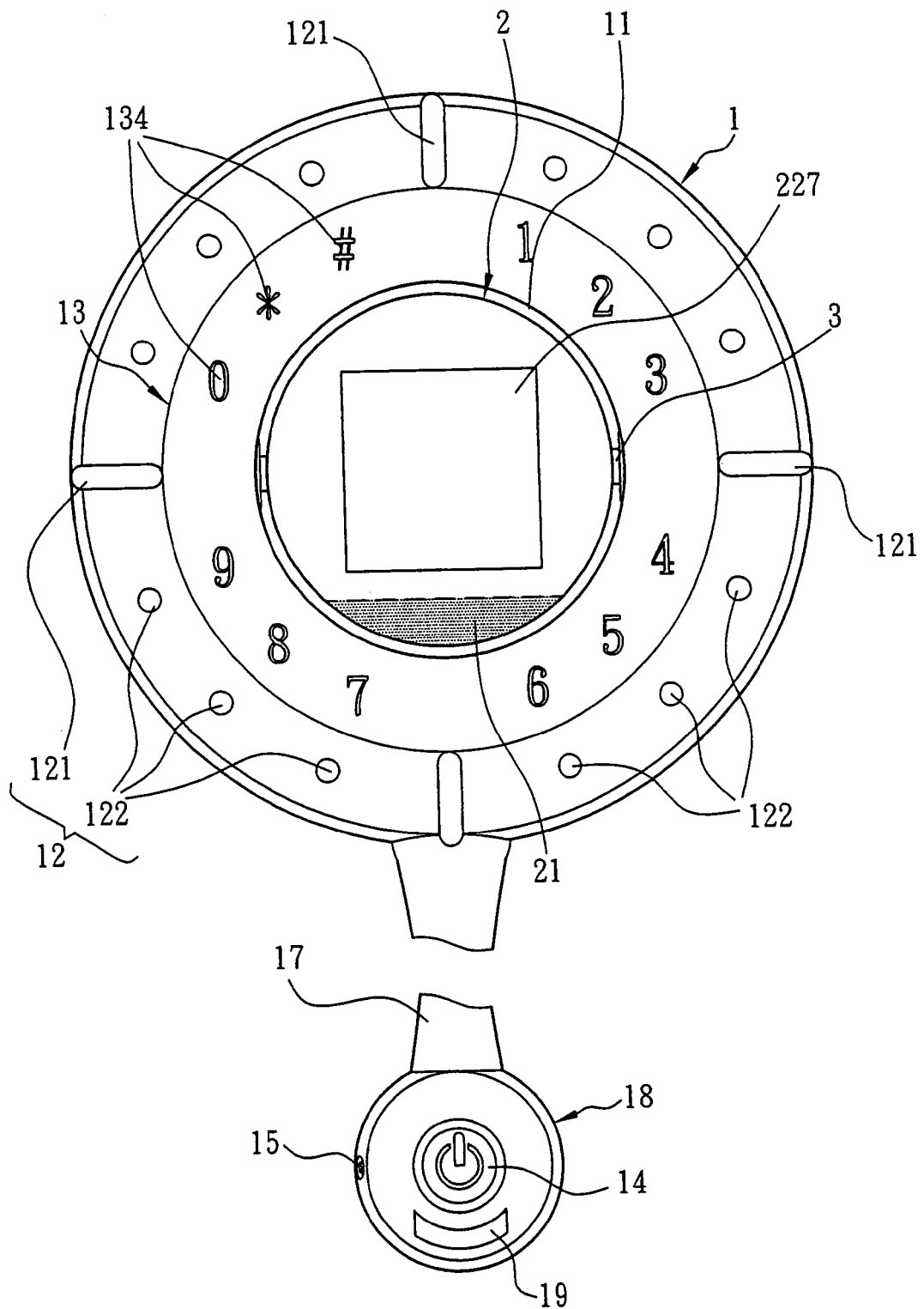
FIG. 1 is a schematic view of an external look of the present invention.
Figure 2:
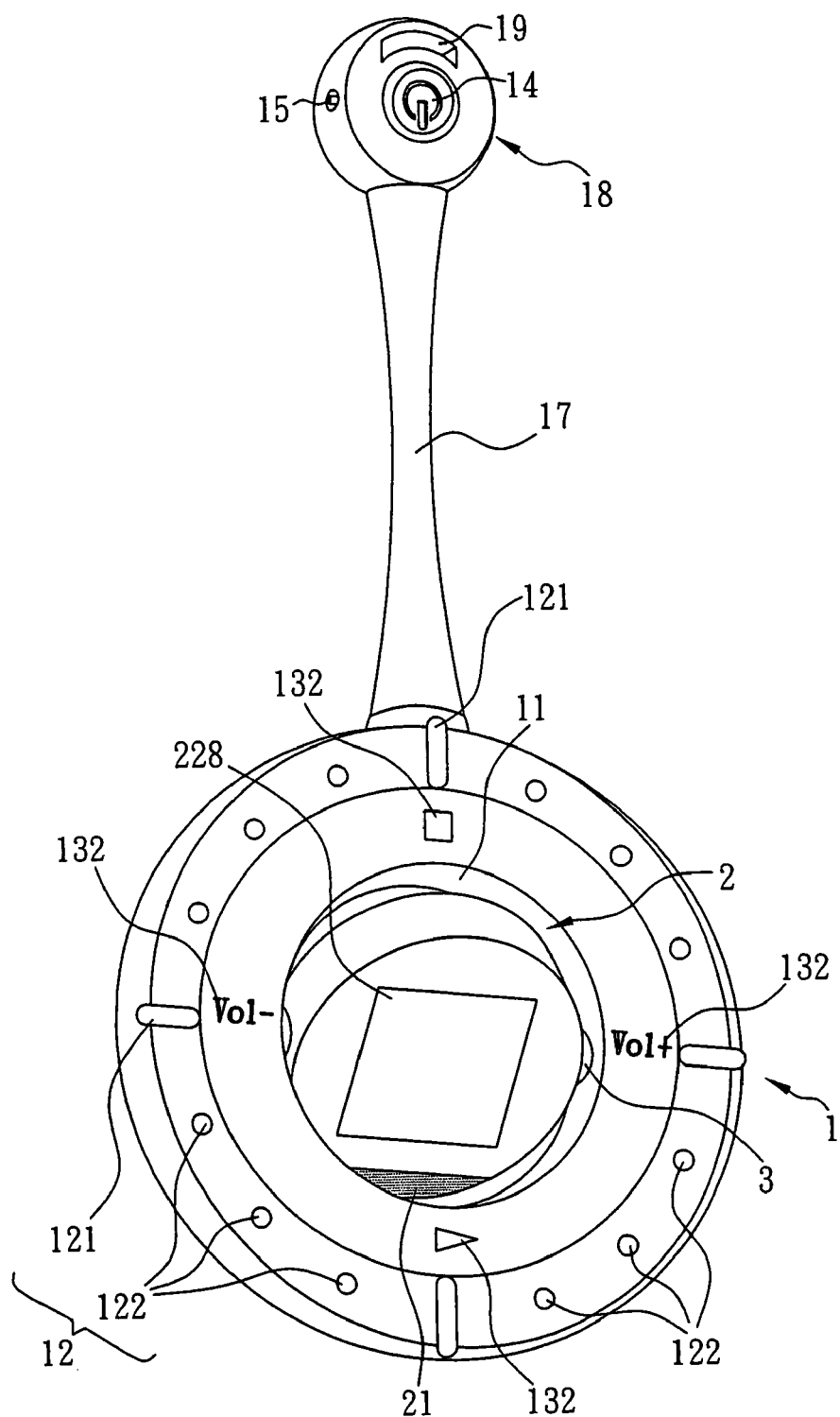
FIG. 2 is a schematic view of operating the present invention.
Figure 3:
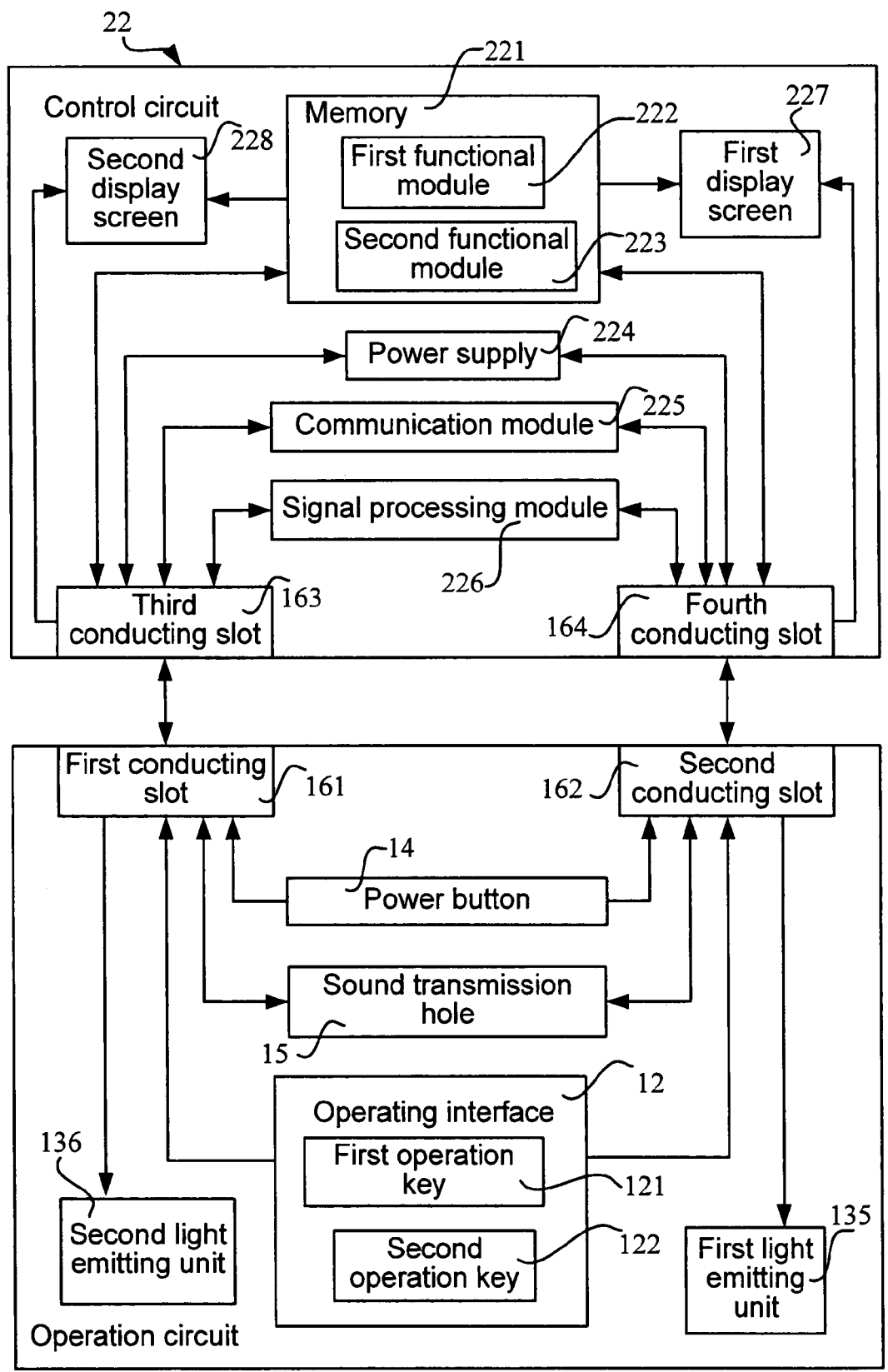
FIG. 3 is a block diagram of electronic components of the present invention.

Referring to FIGS. 1 and 2 for a mobile communication apparatus of the present invention, the mobile communication apparatus comprises a first casing 1 and a second casing 2, wherein the first casing 1 includes an opening 11, and an operating interface 12 (such as a press key or a touch key) disposed on a side of the first casing 1 and around the periphery of the opening 11, and two corresponding ends of the second casing 2 are movably and pivotally coupled into the opening 11, such that the second casing can be movably turned inside the opening 11, and the second casing 2 further includes a first display screen 227 disposed on a side of the second casing 2 and a second display screen 228 disposed on another side of the second casing 2. If the second casing 2 is turned to a position such that the first display screen 227 is on the same side with the operating interface 12, then a first functional module 222 (as shown in FIG. 3) in the mobile communication apparatus will be started, and the first display screen 227 will display a display message outputted by the first functional module 222. If the second casing 2 is turned to a position such that the second display screen 228 is on the same side with the operating interface 12, then a second functional module 223 (as shown in FIG. 3) in the mobile communication apparatus, and the second display screen 228 will display a display message outputted by the second functional module 223. Users no longer need to click or select a corresponding path when switching the first and second functional modules 222, 223. The invention not only provides tremendous convenience, but also saves lots of time.

If a user turns the second casing 2 in the opening 11 by a hand to achieve the purpose of switching the first and second functional modules 222, 223, further improvements can be made to save the operating time. In a preferred embodiment of the present invention as shown in FIGS. 1 and 2, a weight portion 21 is disposed on the second casing 2 at a position apart from an end of the second casing 2 pivotally coupled with the first casing 1, such that if the first casing 1 is turned over, the weight portion 21 will drive the second casing 2 to turn in a direction towards an end of the first casing 1 due to the gravitational force, and the first display screen 227 exposed from the second casing 2 will be on the same side with the operating interface 12, and the mobile communication apparatus will start the first functional module 222. If the first casing 1 is turned over again, the weight portion 21 will drive the second casing 2 to turn towards another end of the first casing 1 due to the gravitational force, and the second display screen 228 exposed from the second casing 2 will be on the same side with the operating interface 12, and the mobile communication apparatus will close the first functional module 222 and start a second functional module 223 in the mobile communication apparatus.

The first casing 1 and the second casing 2 are pivotally coupled with each other and connected to two corresponding two ends of the pivots 3, and the second casing 2 can use an end of these two pivots 3 as an axis to turn the whole second casing 2 within 360 degrees in the opening 11. If the second casing 2 is turned over by 180 degrees in the opening 11, the first and second display screens 227, 228 can be switched.

In the embodiment as shown in FIGS. 1 to 3, a control circuit 22 is installed in the second casing 2 of the mobile communication apparatus and the control circuit 22 is electrically and separately coupled to the first display screen 227 and the second display screen 228. The embodiment comprises a memory 221 (such as a flash memory), a power supply 224 (such as a battery), a communication module 225, and a signal processing module 226 (such as an audio transaction module), wherein the memory 221 stores the first and second functional modules 222, 223 and other data; the power supply 224 supplies the required operating power for all components of the mobile communication apparatus, and the power supply 224 comes with a certain weight and serves as the weight portion 21 disposed at an end of the second casing 2 in this embodiment; the signal processing module 226 receives or transmits a plurality of audio signals; and the communication module 225 is provided for transmitting and receiving a plurality of communication signals and communicating with the outside.

In the embodiment as shown in FIGS. 1 to 3, the operating interface 12 includes a plurality of first operation keys 121 and a plurality of second operation keys 122, and the first and second operation keys 121, 122 are mixed and distributed on the first casing 1, and each first operation key 121 corresponds to the first functional module 222 for executing a corresponding operating instruction in the first functional module 222 after the first functional module 222 is started, and each second operation key 122 corresponds to the second functional module 223 for executing a corresponding operation instruction in the second functional module 223 after the second functional module 223 is started.

In FIGS. 1 and 3, the first casing 1 includes a label portion 13 (such as an LCD screen or a luminescent display panel) embedded around the opening 11 and the operating interface 12, and the label portion 13 is provided for showing different operation instruction names of the operating interface 12 when the first or second functional module 222, 223 is started; and the label portion 13 of this embodiment is a light transmitting plate engraved with a plurality of first label symbols 132 and a plurality of second label symbols 134, and the first and second label symbols 132, 134 are mixed and distributed on the first casing 1, and each first label symbol 132 corresponds to an adjacent first operation key 121 and has a first light emitting unit 135 facing towards the interior of the first casing 1, such that if each first light emitting unit 135 at the first functional module 222 is started, light will be emitted and projected onto the light transmitting plate to show each first label symbol 132, and each second label symbol 134 corresponds to an adjacent second operation key 122 and faces towards a corresponding second light emitting unit 136 in the first casing 1. Each second light emitting unit 136 emits light to the light transmitting plate to show each second label symbol 134, only if the second functional module 223 is started.

Referring to FIGS. 1 to 3, the first casing 1 further comprises an operation circuit 10 coupled separately to the first and second light emitting units 135, 136 and the operating interface 12, such that when the first or second functional module 222 or 223 is started, the operation circuit 10 electrically conducts the control circuit 22, and drives the control circuit 22 to start the first or second light emitting unit 135 or 136 corresponding to the first or second label symbol 132, 134, and receives an operation instruction transmitted and triggered by each first or second operation key 121 or 122. In the meantime, the first casing 1 further comprises a power button 14 and a sound transmission hole 15, and the power button 14 is electrically connected to the power supply 224 through the control circuit 22. When the power button 14 is pressed, the power supply 224 is turned on or off for selectively outputting operating power; and the sound transmission hole 15 is provided for transmitting and receiving a plurality of audio signals, and sending the audio signals to a signal processing module 226.

Figure 4:
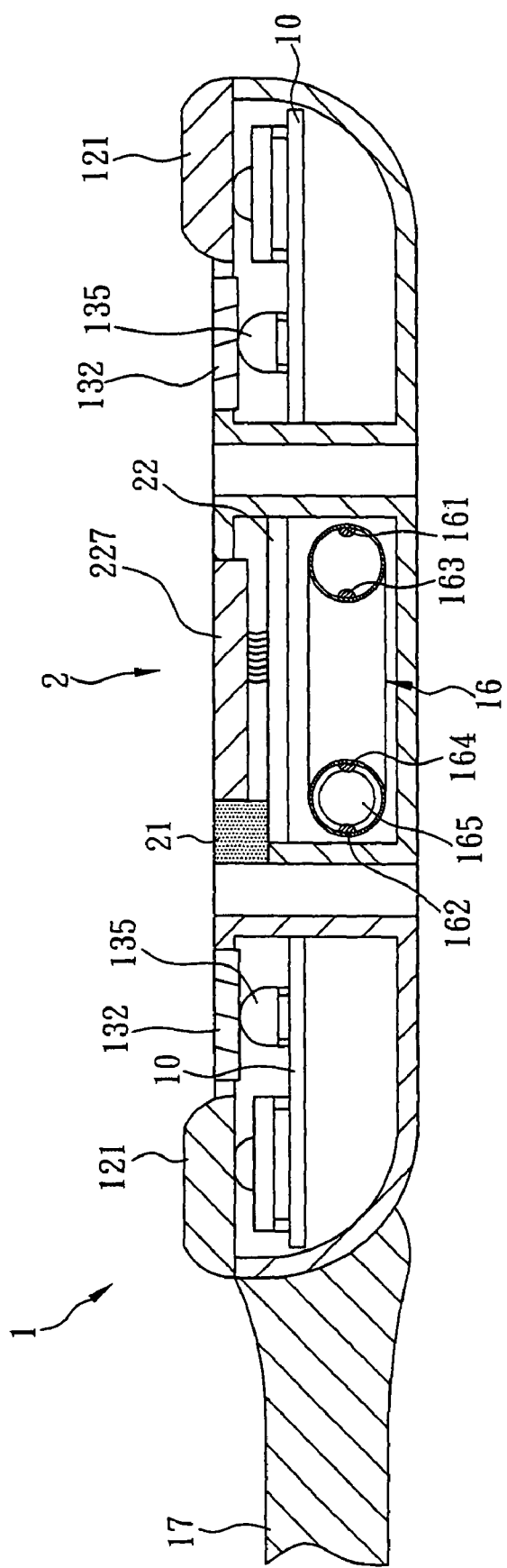
FIG. 4 is a longitudinal cross-sectional view of the present invention.

In the present invention as shown in FIGS. 1, 3 and 4, a circular channel 16 is built along the periphery of the opening 11 in the second casing 2, and a first conducting slot 161 and a second conducting slot 162 are disposed separately apart from a sidewall of a pivot 3, and the first conducting slot 161 and second conducting slot 162 are connected separately with the operation circuit 10 through the pivots 3, and a third conducting slot 163 and a fourth conducting slot 164 are disposed at positions opposite to the sidewalls of the first conducting slot 161 and the second conducting slot 162 in the channel 16 respectively and the third and fourth conducting slots 163, 164 are coupled to the control circuit 22, and a conducting ball 165 is movably disposed in the channel 16. If the weight portion 21 drives the second casing 2 to turn the first casing 1 towards an end due to the gravitational force, and the gravitational force produces an inertia when the second casing 2 is turned and rolls a conducting ball 165 between the first and third conducting slots 161, 163, or the first and fourth conducting slots 162, 164 electrically conduct the respective conducting slots, so as to electrically conduct the operation circuit 10 and the control circuit 22 to form an open circuit and facilitate a signal transmission between the first and second casings 1, 2.

With the foregoing components, if the conducting ball 165 is rolled between the first and third conducting slots 161, 163 or the first and fourth conducting slots 162, 164, the conducting ball 165 not only helps fixing the second casing 2 into its position, but also serves as an electrically conducting medium between the first and third conducting slots 161, 163 or the first and fourth conducting slots 162, 164 for starting the first or second functional module 222 or 223. In the meantime, the first or second light emitting unit 135, 136 corresponding to the first or second label symbol 132, 134 emits light to the light transmitting plate to show the operation instruction name represented by the corresponding operating interface 12.

Referring to FIGS. 1 and 2, the first casing 1 of this embodiment is a torus, and the opening 11 of the first casing 1 and the second casing 2 are substantially in an arc shape, and the first and second functional modules 222, 223 in the memory 221 are a MP3 player module and a dial program module respectively, and the first operation key 121 provided for controlling the MP3 player module can be a plurality of multimedia keys, and the second operation key 122 provided for controlling the dial program module is a plurality of mobile phone keys. If the first functional module 222 is started, each first label symbol 132 representing an operation instruction name (such as a Play key and a Pause key) of a multimedia key will be displayed on the corresponding light transmitting plate by the first light emitting unit 135. If the second functional module 223 is started, each second label symbol 134 representing an operation instruction name (such as a numeric key, a direction key and a dial key) representing a mobile phone key will be displayed on the corresponding light transmitting plate by the second light emitting unit 136.

Referring to FIGS. 1 and 2, a handle 17 is extended from an end of the first casing 1, and a circular disc body 18 is disposed at an end of the handle 17, and a power button 14 is installed at a lateral side of the circular disc body 18, such that when the power button 14 is pressed, a communication module 225 (as shown in FIG. 3) enters into a ready mode and gets ready to receive an external communication signal; and a sound transmission hole 15 is disposed on the circular disc body 18 and proximate to an end of the power button 14, and the sound transmission hole 15 can be connected to an amplifier speaker for transmitting a sound produced by the MP3 player module or communication module 225, and the circular disc body 18 further includes a penetrating hole 19 for passing a thread to hang the mobile communication apparatus.

If a user holds the handle 17 to turn the first casing 1 downward, the second casing 2 will be forced to turn in a direction opposite to the handle 17 due to the effect of the gravitational force on the weight portion 2. By then, the conducting ball 165 will be rolled to a position between the first and third conducting slots 161, 163. Once if the control circuit 22 learns that the electrical connection between the first and third conducting slots 161, 163 with the operation circuit 10 (as shown in FIG. 3) constitutes an open circuit, the conduction signal will start the MP3 player module. By then, only the operation instruction name of each multimedia key corresponding to each first label symbol 132 will be displayed, such that users can learn or know the operation of each multimedia key from the operation instruction name of each multimedia key. If any of the multimedia keys is pressed, an operation instruction corresponding to that particular multimedia key will be issued and transmitted to the MP3 player module of the second casing 2 to operate the MP3 player module.

On the other hand, if a user holds the handle 17 to turn the first casing 1 upward, the second casing 2 will be forced to turn towards the handle 17 due to the effect of the gravitational force on the second casing 2. By then, the conducting ball 165 will be rolled to a position between the first and fourth conducting slots 162, 164. Once if the control circuit 22 learns that the electrical connection between the first and fourth conducting slots 162, 164 with the operation circuit 10 constitutes an open circuit, the conduction signal will start the dial program module. By then, only the operation instruction name of each mobile phone key corresponding to each second label symbol 134 will be displayed, such that users can learn or know the operation of each mobile phone key from the operation instruction name of each mobile phone key. If any of the mobile phone keys is pressed, an operation instruction corresponding to that particular mobile phone key will be issued and transmitted to the dial program module of the second casing 2 to operate the dial program module.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A mobile communication apparatus, comprising:
a first functional module;
a second functional module;
a first casing, comprising:
an opening disposed thereon;
an operating interface disposed on a side of the first casing and around the periphery of the opening, and comprising:
a plurality of first operation keys, corresponding to said first functional module, for separately executing a different operation instruction in said first functional module, when said first functional module is started; and
a plurality of second operation keys, corresponding to said second functional module for separately executing a different operation instruction in said second functional module, when said second functional module is started;
a light transmitting plate disposed between said opening and the periphery of said operating interface, for showing different operation instruction names of said operating interface when said first or second functional module is started separately, and comprising:
a plurality of first label symbols, separately corresponding to said first operation key adjacent thereto and a first light emitting unit facing towards the interior of said first casing, such that said first light emitting unit can emit light to said light transmitting plate when said first functional module is started; and
a plurality of second label symbols, separately corresponding to said second operation key adjacent thereto and a second light emitting unit facing towards the interior of said first casing, such that said second light emitting unit can emit light to said light transmitting plate when said second functional module is started;
an operation circuit, installed in said first casing, and connected separately to said first light emitting unit, said second light emitting unit and said operating interface, such that said first or second functional module can be started when a control circuit is electrically conducted; a power button, installed on said first casing, and connected with said control circuit and a power supply, for switching the supply of operating power outputted by said power supply; and a sound transmission hole, disposed on said first casing and electrically conducted by said control circuit and a signal processing module, for transmitting and receiving a plurality of audio signals; and
a second casing, pivotally coupled into said opening such that said second casing turns inside said opening, and comprising:
a first display screen and a second display screen disposed on two corresponding surfaces of said second casing respectively;
said control circuit, installed in said second casing, and conducted separately to said first display screen and said second display screen;
a memory, installed on said control circuit, for storing said first and second functional modules;
said power supply, installed on said control circuit, for supplying operating power to said mobile communication apparatus;
a communication module, installed on said control circuit, for transmitting and receiving a plurality of communication signals, and communicating with the outside;
a signal processing module, installed on said control circuit, for externally receiving or transmitting a plurality of audio signals;
a channel, disposed on said second casing and adjacent to periphery of said opening; a first conducting slot, disposed in said channel and apart from a sidewall pivotally coupled to said first casing, and connected to said operation circuit;
a second conducting slot, disposed in said channel and apart from another sidewall pivotally coupled to said first casing, and connected to said operation circuit;
a third conducting slot, disposed in said channel and facing a sidewall of said first conducting slot, and connected to said control circuit;
a fourth conducting slot, disposed in said channel and facing a sidewall of said second conducting slot, and connected to said control circuit; and
a conducting ball, movably disposed in said channel, and rolled between said first and third conducting slots or said first and fourth conducting slots, for electrically conducting said operation circuit and said control circuit;

whereby, when said second casing is at a position where said first display screen is on the same side of said operating interface, said mobile communication apparatus will start said first functional module and a display message outputted by said first functional module will be displayed by said first display screen, or when said second casing is at a position where said second display screen is on the same side of said operating interface, said mobile communication apparatus will start said second functional module, and said second display screen will display a display message outputted by said second functional module.

2. The mobile communication apparatus of claim 1, wherein said two corresponding ends pivotally coupled to said first casing and second casing have a pivot separately.

3. The mobile communication apparatus of claim 1, wherein said first casing further comprises:
a handle, extended from an end of said first casing; and
a circular disc body, disposed on an end of said handle and apart from said first casing.

4. The mobile communication apparatus of claim 3, wherein said circular disc body has a penetrating hole, for passing a thread to hang said mobile communication apparatus.

5. A mobile communication apparatus, comprising:
a first functional module;
a second functional module;
a first casing, comprising:
an opening disposed thereon;
an operating interface disposed on a side of the first casing and around the periphery of the opening, and comprising:
a plurality of first operation keys, corresponding to said first functional module, for separately executing a different operation instruction in said first functional module, when said first functional module is started; and
a plurality of second operation keys, corresponding to said second functional module for separately executing a different operation instruction in said second functional module, when said second functional module is started;
a light transmitting plate disposed between said opening and the periphery of said operating interface, for showing different operation instruction names of said operating interface when said first or second functional module is started separately, and comprising:
a plurality of first label symbols, separately corresponding to said first operation key adjacent thereto and a first light emitting unit facing towards the interior of said first casing, such that said first light emitting unit can emit light to said light transmitting plate when said first functional module is started; and
a plurality of second label symbols, separately corresponding to said second operation key adjacent thereto and a second light emitting unit facing towards the interior of said first casing, such that said second light emitting unit can emit light to said light transmitting plate when said second functional module is started;
an operation circuit, installed in said first casing, and connected separately to said first light emitting unit, said second light emitting unit and said operating interface, such that said first or second functional module can be started when a control circuit is electrically conducted; a power button, installed on said first casing, and connected with said control circuit and a power supply, for switching the supply of operating power outputted by said power supply; and a sound transmission hole, disposed on said first casing and electrically conducted by said control circuit and a signal processing module, for transmitting and receiving a plurality of audio signals; and a second casing, pivotally coupled into said opening, and comprising:

a first display screen and a second display screen disposed on two corresponding surfaces of said second casing respectively;

said control circuit, installed in said second casing, and conducted separately to said first display screen and said second display screen;

a memory, installed on said control circuit, for storing said first and second functional modules;

said power supply, installed on said control circuit, for supplying operating power to said mobile communication apparatus;

a communication module, installed on said control circuit, for transmitting and receiving a plurality of communication signals, and communicating with the outside;

a signal processing module, installed on said control circuit, for externally receiving or transmitting a plurality of audio signals;

a channel, disposed on said second casing and adjacent to periphery of said opening; a first conducting slot, disposed in said channel and apart from a sidewall pivotally coupled to said first casing, and connected to said operation circuit;

a second conducting slot, disposed in said channel and apart from another sidewall pivotally coupled to said first casing, and connected to said operation circuit;

a third conducting slot, disposed in said channel and facing a sidewall of said first conducting slot, and connected to said control circuit;

a fourth conducting slot, disposed in said channel and facing a sidewall of said second conducting slot, and connected to said control circuit; and a conducting ball, movably disposed in said channel, and rolled between said first and third conducting slots or said first and fourth conducting slots, for electrically conducting said operation circuit and said control circuit;

a weight portion disposed on said second casing at a position apart from an end of said second casing pivotally coupled with said first casing, for driving said second casing to turn inside said opening after said weight portion is turned upside down in said first casing, so that said second casing is exposed from said first display screen or said second display screen on the same side of said operating interface;

whereby, when said second casing is at a position where said first display screen is on the same side of said operating interface, said mobile communication apparatus will start said first functional module and a display message outputted by said first functional module will be displayed by said first display screen, or when said second casing is at a position where said second display screen is on the same side of said operating interface, said mobile communication apparatus will start said second functional module, and said second display screen will display a display message outputted by said second functional module.

6. The mobile communication apparatus of claim 5, wherein said two corresponding ends pivotally coupled to said first casing and second casing have a pivot separately.

7. The mobile communication apparatus of claim 5, wherein said first casing further comprises:

a handle, extended from an end of said first casing; and a circular disc body, disposed on an end of said handle and apart from said first casing.

8. The mobile communication apparatus of claim 7, wherein said circular disc body has a penetrating hole, for passing a thread to hang said mobile communication apparatus.

* * * * *